T. L. MILLER.
AUTOMOBILE BODY BRACE.
APPLICATION FILED JULY 13, 1921.
1,433,143.
Patented Oct. 24, 1922.
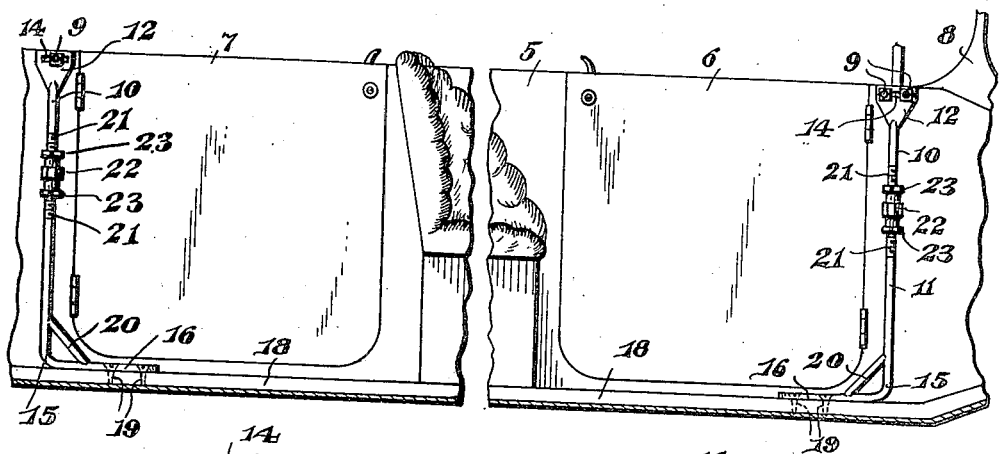
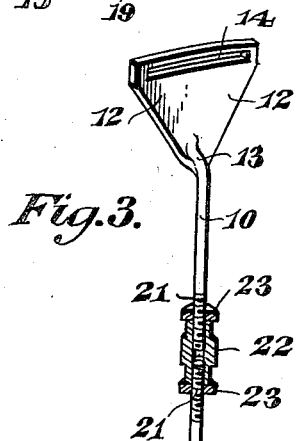
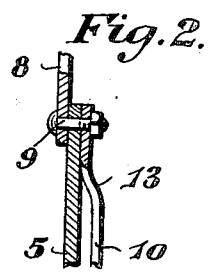
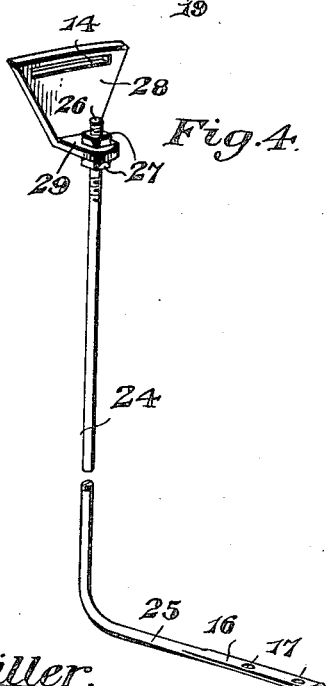
T. L. Miller,
INVENTOR.
BY Bernard F. Garvey
ATTORNEY.

Patented Oct. 24, 1922.

1,433,143

UNITED STATES PATENT OFFICE.

THOMAS L. MILLER, OF SONORA, TEXAS.

AUTOMOBILE BODY BRACE.

Application filed July 13, 1921. Serial No. 484,309.

*To all whom it may concern:*

Be it known that I, THOMAS L. MILLER, a citizen of the United States, residing at Sonora, in the county of Sutton, and State of Texas, have invented certain new and useful Improvements in Automobile Body Braces, of which the following is a specification.

The present invention relates to automobile body braces and embodies a structure which is especially adapted to relieve distortion of automobile bodies including sagging of the doors thereby permitting free opening and closing movement of the doors.

It is well known in the use of automobiles, especially of the Ford type, that the bodies become distorted, causing the doors to sag, thereby rendering it inconvenient and sometimes impossible to open or close the doors. It is, therefore, the principal object of this invention to provide a brace which will strengthen the body; also to provide a brace capable of facile and expeditious operation to right the body and thereby permit normal use of the doors.

A further object of the invention is to provide a device of simple character which may be readily applied to cars, without detracting from the appearance of the latter.

The above and other objects of this invention will be better understood from the following description of the present preferred embodiment of the invention taken in connection with the accompanying drawings wherein:

Fig. 1 is a fragmentary longitudinal sectional view of an automobile body illustrating the application of braces, constructed in accordance with this invention, applied to both the front and rear doors;

Fig. 2 is a detail fragmentary sectional view illustrating to advantage the manner in which the body plate is connected to the automobile body;

Fig. 3 is a perspective view of the brace per se and

Fig. 4 is a similar view of a modified form of brace.

In the drawings, in order to illustrate the application of this invention a portion of an automobile body 5 is shown which is equipped with front and rear doors 6 and 7 respectively which may be of the usual or any desired configuration. The type of automobile bodies shown in the drawings is similar to the Ford touring car in which, as is well known, the front doors are hinged in proximity to the cowl as shown in Fig. 1 of the drawings. A windshield bracket 8, of usual design, is attached to the front of the automobile body over the cowl, and is secured to the sides of the body by means of bolts 9, as shown to advantage in Fig. 2.

The preferred form of brace shown to advantage in Fig. 3 consists of an upper and lower section generaly designated 10 and 11 respectively. The upper section consists of a body plate 12 which in this instance is shown to be of a substantially triangular configuration the apex of which is laterally offset, as indicated at 13 and shown to advantage in Fig. 2. This offset portion is reduced and issues into a rod circular in cross section which, when in use, extends parallel to the side of the automobile body. The plate 12 is provided with an elongated slot 14 through which the wind shield bolts 9 are adapted to pass, when the brace is used in the front of the car, while a similar bolt or bolts is engaged through the automobile body and said slot 14, as shown at the left side of Fig. 1, when the brace is used in the rear of the car.

The lower section 11 of the brace consists of a rod also circular in cross section the lower end 15 of which is bent at right angles and the free terminal thereof flattened to provide a rail strap 16 through which openings 17 are formed. The rail strap is adapted to be secured to the body rail 18 of the automobile body by means of screws 19 or or other suitable detachable fastening means. If desired, a reenforcing element 20 may be engaged with the right angled portion 15 and the body portion of said section 11 for an obvious purpose.

The adjacent ends of the sections 10 and 11 are provided with screw threads 21 of different pitch which receive corresponding threads formed in the bore of a turn buckle 22. To prevent casual movement of the turn buckle, jam nuts 23 are mounted on the screw threads 21 directly above and below the turn buckle 23.

In using this form of the invention, the rail strap 16 is secured to the body rail of the automobile in a manner already described while the body plate is detachably engaged with the wind shield bolts, in the front of the car and preferably with a single bolt, when used in the back of the car, as shown in Fig. 1. After having been mounted in this way, it is but necessary to disengage the nuts 23 following which pressure is exerted upon the turn buckle 22 which will cause the sections 10 and 11 to be moved toward or away from each other acording to the direction in which the turn buckle is operated. In this way, an irregular condition in the automobile body can be overcome to insure normal use of the car doors.

If desired, a single rod 24 may be used, as shown in the modifications illustrated in Fig. 4 of the drawings, in which case the lower end of the rod is bent at right angles, as indicated at 25 and is of the same construction, and used in the same capacity as the right angled portion 15 is used with the other form of the invention. The free end of the rod is equipped with screw threads 26 which receive a pair of nuts 27. The body plate, as indicated at 28, is similar to the body plate 12 except that the apex 29 thereof is bent at right angles and detachably mounted on the rod 24 between the nuts 27. Consequently, when it is desired to adjust the body plate 28 with respect to the rail strap, the nuts 27 only are operated. This form of the invention eliminates use of the turn buckle.

By offsetting the rod embodied in the section 10, as shown in Fig. 2 of the drawings, it will be apparent that ample space is provided to permit the turn buckle 22 and jam nuts 23 to be conveniently turned. It is to be understood, however, that any desired type of adjusting means may be used which is operable to relatively move the sections 10 and 11. Moreover, various other changes may be made in this device, especially in the details of construction, preparation and arangement of parts, without departing from the spirit and scope of the invention.

What is claimed is:—

An automobile body brace including a body plate provided with an elongated slot and engageable with the upper inner face of the side of the body adjacent a door of the latter, means engageable through the automobile body and the slot in said plate to detachably secure the latter to the body, means extending downwardly from said plate on the inside of the automobile body and having the lower end thereof bent at right angles and detachably engaged with the body rail of the automobile, and means to relatively move said body plate and right angled body rail-engaging portion.

THOMAS L. MILLER.